United States Patent
Poliak et al.

[11] 3,713,071
[45] Jan. 23, 1973

[54] MOUNTING STRAP FOR GROUNDING ELECTRICAL DEVICES

[75] Inventors: John M. Poliak, East Meadow; Juan M. Lopez, Elmhurst, both of N.Y.

[73] Assignee: Leviton Manufacturing Co., Inc., Brooklyn, N.Y.

[22] Filed: April 21, 1971

[21] Appl. No.: 135,902

[52] U.S. Cl. .......................... 339/14 R, 339/133 R
[51] Int. Cl. ............................................... H01r 3/06
[58] Field of Search .......... 335/14, 133, 134; 174/51

[56] References Cited

UNITED STATES PATENTS

| | | | |
|---|---|---|---|
| 3,432,793 | 3/1969 | Muska et al. | 339/14 R |
| 2,395,141 | 2/1946 | Poupitch | 151/14 |
| 3,185,760 | 5/1965 | Despard | 174/54 |
| 3,609,213 | 9/1971 | Winter | 339/14 R |

*Primary Examiner*—Marvin A. Champion
*Assistant Examiner*—Robert A. Hafer
*Attorney*—Hanse H. Hamilton

[57] ABSTRACT

A mounting strap for supporting a wiring device in a metal wall box and establishing an electrical connection between a metal mounting screw and the strap. Said screw forming a ground connection when the screw threadably engages with the metal wall box. The connection between the strap and screw is established by a finger carried by a resilient member having a free end extending into a screw receiving slot in the strap at one side thereof and forcing the screw into engagement with an opposite side of the slot.

4 Claims, 7 Drawing Figures

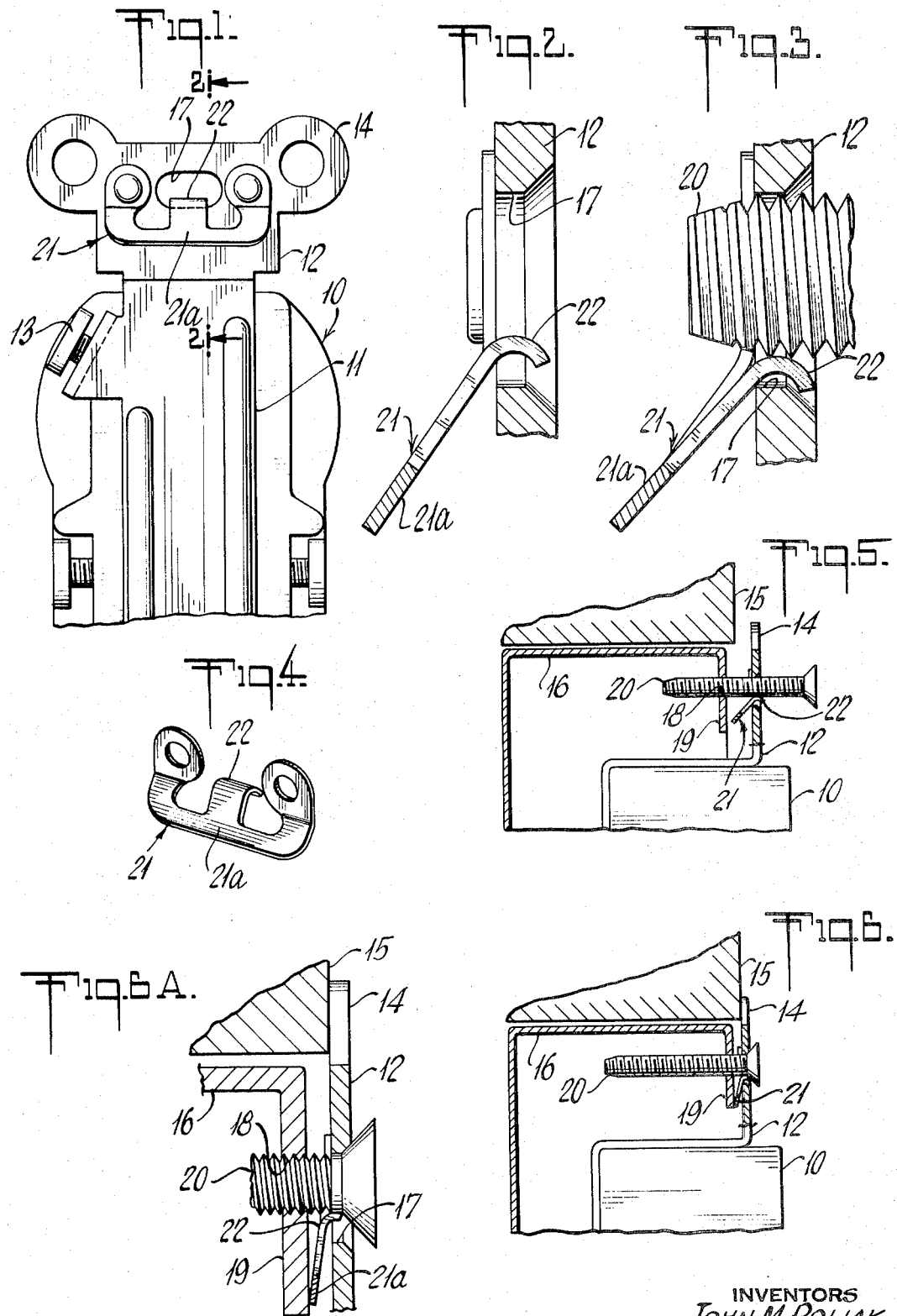

MOUNTING STRAP FOR GROUNDING ELECTRICAL DEVICES

The present invention relates to a mounting strap for grounding an electrical wiring device such as a receptacle or switch.

It relates, more particularly, to a mounting strap which establishes an electrical connection between a mounting strap and a mounting screw inserted through the strap and threaded into a metal box or gem box.

An object of the present invention is to establish a reliable electrical connection between the mounting strap for an electrical wiring device and standard mounting screws which are used to secure the wiring device in a metal wall box. When the metal wall box is connected to ground, this automatically provides a satisfactory ground connection between the wiring device and the wall box without the necessity of a separate ground connection being made to the wiring device.

Other objects and advantages of the present invention will become apparent and be better understood from the following description and the accompanying drawing in which:

FIG. 1 is a rear plan view of an electrical wiring device having a mounting strap which incorporates the present invention and is drawn to an enlarged scale.

FIG. 2 is a section view taken along line 2—2 of FIG. 1 which illustrates one end of the mounting strap shown in FIG. 1;

FIG. 3 corresponds to FIG. 2 with a mounting screw having been partially inserted in the mounting strap and being electrically connected thereto;

FIG. 4 is a perspective view of a spring member attached to the mounting strap shown in FIG. 1 and which establishes the electrical connection between the screw and mounting strap as shown in FIG. 3;

FIG. 5 is a fragmentary side view in partial section of the electrical wiring device shown in FIG. 1 with the device being partially installed in a wall box by means of the mounting screw and is drawn to a reduced scale;

FIG. 6 corresponds to FIG. 5, but with the wiring device having been fully installed in the wall box; and FIG. 6a is a fragmentary view illustrating part of FIG. 6 on an enlarged scale.

Reference is made briefly to U.S. Pat. No. 3,432,793 issued Mar. 11, 1969 to William A. Muska et al. for "Grounding Connection For Electrical Unit" which relates to an electrical connection of the type to which the present invention relates.

Referring now to the drawing in detail, FIG. 1 shows an electrical wiring device 10 in the form of a three-prong or grounding type of duplex receptacle. It will be understood that the present invention may be employed in connection with other electrical wiring devices such as switches or the like if desired.

In the form illustrated, the electrical wiring device 10 is seated in a U-shaped metal supporting strap or yoke 11 of steel or other metal. The ends 12 of the strap 11 extend beyond the wiring device 10 at opposite ends thereof. However, it will be understood that the supporting or mounting strap 11 need not be U-shaped, but other configurations may be employed including mounting straps which extend through the wiring device.

As illustrated, the mounting strap 11 may be provided with the customary grounding terminal 13 which is internally connected to the grounding contacts of the receptacle 10 (not shown). Such a terminal 13 requires a separate ground connection and may be employed where the wiring device is installed in a system where the wall boxes are non-metallic or are not grounded. However, generally speaking, the present invention makes a separate grounding connection to the terminal 13 unnecessary where a grounded metallic wall box is used.

The ends 12 of the mounting strap 11 which extend beyond the wiring device 10, have enlargements 14 known as plaster ears which are designed to rest upon the surface of a wall 15 when the wiring device 10 is installed in a wall box 16, as shown in FIGS. 5 and 6.

Intermediate the plaster ears 14, the ends 12 of the mounting strap 11 contain elongated openings 17 which can be aligned with threaded openings 18 formed in tabs or ears 19 extending inwardly from the upper edges of the end walls of the box 16. In installing the wiring device, metal mounting screws 20 are inserted through the openings and threaded into the openings 18 in the ears 19. However, the width of the openings 17 is made somewhat larger than the diameter of the mounting screw 20 and hence, cannot be relied upon to establish an electrical connection between the screws and the strap.

To establish such a connection, a member 21 of a resilient material such as phosphor bronze or nylon is secured at its ends to the end 12 of the mounting strap 11 and extends across the strap along or lengthwise of the elongated opening 17 therein.

The spring member 21 includes a bendable portion or lip 21a which extends along the opening 17 at one side thereof and which is inclined angularly relative to the plane of the mounting strap 11. The bendable portion 21a carries a finger 22 which extends upwardly and into the opening 17 at one side thereof. The finger 22 is dimensioned to make an interference fit with the mounting screw 20 and thus, force the mounting screw 20 firmly into engagement and electrical contact with the opposite side edge of the opening or the slot 17 in the mounting strap. This establishes a reliable electrical contact between the mounting screw 20 and the strap 11 as the screw is introduced into the slot 17. Thus, the screw 20 will serve as a ground connection between the strap 11 and the metal wall box 16.

In this connection, it will be noted that the arms of the bendable lip 21a supporting the finger 22 act as cantilevers and in addition, a twisting or torsion action will be imparted to the arms of the bendable lip 21a as the mounting screw 20 is inserted as seen in FIG. 3. When the mounting screw 20 is seated, the outer edge of the lip portion 21a of the member 21 engages with the ear 19 of the wall box 16 as shown in FIG. 6. This bends the lip 21a upwardly and increases force exerted by the finger 22 on the mounting screw 20. Thus, dual action takes place when the wiring device is installed in the wall box and establishes a reliable electrical connection between the strap 11 and the mounting screw 20.

The free end of the spring finger 22 may be bent inwardly or relieved to facilitate entry of the mounting screw in the slot 17. This arrangement also eliminates the need for placing retaining washers of cardboard or the like on the mounting screws to hold them in place prior to installation in the wall box.

It will be understood that various changes and modifications may be made in the illustrated embodiment of the invention by those skilled in the art pertaining hereto without departing from the spirit of the invention.

We claim:

1. In a mounting strap for supporting and grounding an electrical wiring device in a metal wall box, said strap being formed of metal and having an end extending beyond the wiring device, said end containing an elongated opening to receive a mounting screw therein for threadably engaging with the wall box, the improvement which comprises:
   a. a member of resilient material secured to an end of the mounting strap;
   b. said member having a downwardly inclined lip extending across the strap and along one side of said elongated opening therein;
   c. said lip being inclined relative to the plane of the strap;
   d. a finger carried by said inclined lip and having an end extending into the elongated opening in the strap at one side thereof;
   e. said end of the finger being spaced from the opposite side of the elongated opening by a distance less than the major diameter of a mounting screw whereby said finger engages with and forces the mounting screw into electrical contact with the mounting strap.

2. In a mounting strap for supporting and grounding an electrical wiring device in a metal wall box, said strap being formed of metal and having an end extending beyond the wiring device, said end containing an elongated opening to receive a mounting screw therein for threadably engaging with the wall box, the improvement as defined in claim 1 wherein:
   a. the member of resilient material is secured at opposite ends thereof to the mounting strap; and
   b. the spring finger carried by said resilient member engages with and forces the mounting screw into electrical contact with the metal supporting strap.

3. In a mounting strap for supporting and grounding an electrical wiring device in a metal wall box, said strap being formed of metal having an end extending beyond the wiring device, said end containing an elongated opening to receive a mounting screw therein for threadably engaging with the wall box, the improvement as defined in claim 2 wherein:
   a. the lip forms part of the resilient member and is inclined downwardly relative to the plane of the strap; and
   b. said lip is bendable with a twisting action and engages with the wall box when the mounting strap is seated on the wall box.

4. In a mounting strap for supporting an electrical wiring device in a metal wall box and establishing a ground connection between the strap and the wall box, the improvement which comprises
   a. a metal mounting strap;
   b. said strap having a wiring device attached thereto and having an end extending beyond the wiring device;
   c. said end of the strap containing an elongated opening therein adapted to receive a metal mounting screw for threadable engagement with a wall box, and
   d. a resilient member attached to the strap and extending along one side of the elongated opening in the strap;
   e. said member having arms disposed angularly relative to a surface of the mounting strap;
   f. said arms opposing the wall box and being capable of being twisted relative to the strap upon engagement with the wall box;
   g. a spring finger attached to said arms and having a free end extending into the elongated opening in the strap at one side thereof;
   h. said spring finger being positioned for engagement with a mounting screw inserted in said elongated opening in the strap and forcing the mounting screw into electrical contact with an opposing side of the elongated opening in the strap when said arms are brought into engagement with the wall box.

* * * * *